US012343885B2

(12) United States Patent
Stokes et al.

(10) Patent No.: US 12,343,885 B2
(45) Date of Patent: Jul. 1, 2025

(54) BLADE DISPENSER

(71) Applicant: Fiskars Finland Oy Ab, Espoo (FI)

(72) Inventors: Steve Stokes, Fitchburg, WI (US); Emery K. Weber, Madison, WI (US)

(73) Assignee: Fiskars Finland Oy Ab, Espoo (FI)

( * ) Notice: Subject to any disclaimer, the term of this patent is extended or adjusted under 35 U.S.C. 154(b) by 284 days.

(21) Appl. No.: 18/033,683

(22) PCT Filed: Oct. 26, 2021

(86) PCT No.: PCT/EP2021/079729
§ 371 (c)(1),
(2) Date: Apr. 25, 2023

(87) PCT Pub. No.: WO2022/090260
PCT Pub. Date: May 5, 2022

(65) Prior Publication Data

US 2023/0415364 A1 Dec. 28, 2023

Related U.S. Application Data

(60) Provisional application No. 63/106,006, filed on Oct. 27, 2020.

(51) Int. Cl.
*B26B 1/08* (2006.01)

(52) U.S. Cl.
CPC .................................... *B26B 1/08* (2013.01)

(58) Field of Classification Search
CPC ....................................................... B26B 1/08
See application file for complete search history.

(56) References Cited

U.S. PATENT DOCUMENTS 1,244,338 A * 10/1917 Johnson ................ B65D 83/10 221/232
2,576,589 A * 11/1951 Gabriel .................. B26B 21/24 30/40

(Continued)

FOREIGN PATENT DOCUMENTS

DE 94 06 021 U1 6/1994
EP 0 796 803 A1 9/1997

OTHER PUBLICATIONS

International Search Report and Written Opinion for International Application No. PCT/EP2021/079729, mailed Feb. 22, 2022, 11 pages.

*Primary Examiner* — Sean M Michalski
(74) *Attorney, Agent, or Firm* — FOLEY & LARDNER LLP

(57) ABSTRACT

A blade dispenser includes a housing with a bottom and sidewalls defining a blade storage. A lid covers an entry opening and is movable in relation to the blade storage to provide access to the entry opening for arranging blades in a stacked configuration into the blade storage. A protrusion protrudes from a sidewall into the upper part of the blade storage in a first part of the blade storage. A latch protrudes from a sidewall into the upper part of the blade storage in a second part of the blade storage, the protrusion and latch have contact surfaces preventing the spring force from moving blades out of the blade storage via the entry opening. An exit opening at a sidewall of the housing allows a blade to pass through the exit opening out of the blade storage.

10 Claims, 3 Drawing Sheets

(56) References Cited

U.S. PATENT DOCUMENTS

| | | | | | |
|---|---|---|---|---|---|
| 3,845,554 | A * | 11/1974 | Joanis | B26B 5/00 | 30/330 |
| 4,277,888 | A * | 7/1981 | Szabo | B26B 5/002 | 30/40 |
| 4,465,208 | A * | 8/1984 | Buban | B65D 83/0823 | 206/800 |
| 4,761,882 | A | 8/1988 | Silverstein | | |
| 4,792,058 | A * | 12/1988 | Parker | B65D 83/12 | 221/232 |
| 4,887,739 | A * | 12/1989 | Parker | B65D 83/12 | 221/244 |
| 5,404,645 | A * | 4/1995 | Janser | B26B 5/00 | 30/162 |
| 6,415,514 | B1 | 7/2002 | Chun | | |
| 8,621,753 | B2 * | 1/2014 | Price | B26B 5/001 | 30/162 |
| 2004/0237312 | A1 * | 12/2004 | Hernandez | B26B 5/003 | 30/162 |
| 2010/0281696 | A1 * | 11/2010 | Hao | B26B 5/001 | 30/162 |

* cited by examiner

BLADE DISPENSER

CROSS-REFERENCE TO RELATED APPLICATIONS

This application is a 371 U.S. National Application of International Application No. PCT/EP2021/079729, filed on Oct. 26, 2021, which claims the benefit of and priority to U.S. Provisional Application No. 63/106,006, filed on Oct. 27, 2020, the complete disclosures of which are hereby incorporated by reference for all purposes.

BACKGROUND OF THE INVENTION

Field of the Invention

This invention relates to blade dispenser and more particularly to a blade dispenser for dispensing blades of a knife. In the following the invention will be described mainly by referring to blades of utility knifes. It should, however, be observed that this is only by way of example, and that the invention may be utilized also for dispensing other types of blades.

Description of Prior Art

A utility knife is previously known where the blade used for cutting is implemented as a very thin, mainly planar part having a sharp cutting edge. A challenge with such a utility knife is that the blade is relatively fragile, due which the blade may break and require replacement. Alternatively, even if the blade does not break, it will wear out due to time and require replacement by a new sharper blade.

A challenge with handling spare blades is that these blades are very sharp. Consequently, attention is needed to ensure that the user is not injured during the handling. This is a challenge, in particularly, as breaking of a blade may occur while the user is busy with carrying out a work task and may have difficulties to entirely leave this work task for the time needed to replace the blade. Consequently, it should be as easy as possible for the user to change blade.

SUMMARY OF THE INVENTION

An object of the present invention is to provide a blade dispenser with improved capabilities regarding handling and storage. This object is achieved with the blade dispenser according to independent claim 1.

Preferred embodiments of the invention are disclosed in the dependent claims.

BRIEF DESCRIPTION OF DRAWINGS

In the following the blade dispenser will be described in closer detail by way of example and with reference to the attached drawings, in which.

DESCRIPTION OF AT LEAST ONE EMBODIMENT

Figure 1:
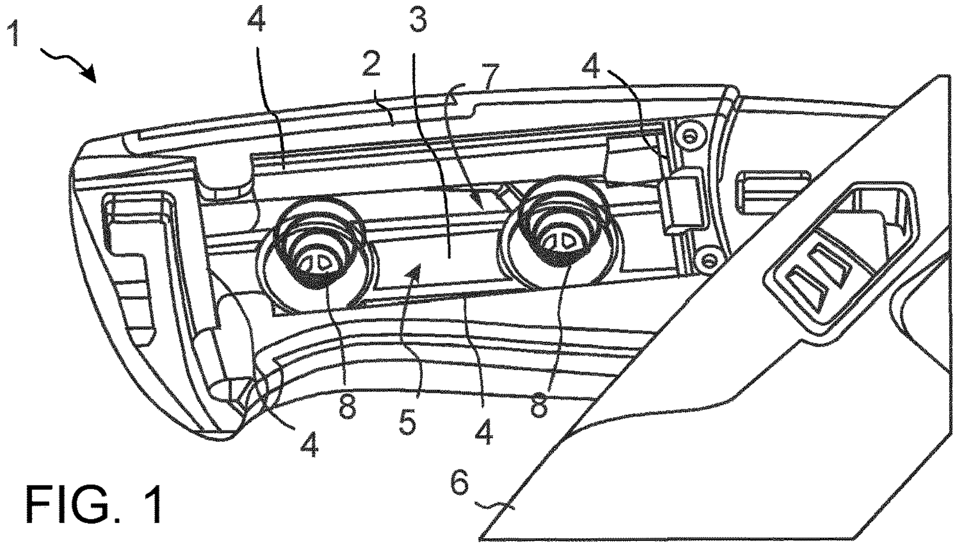
FIGS. 1 to 6 illustrate a first embodiment of a blade dispenser.

FIGS. 1 to 5 illustrate a first embodiment of a blade dispenser. The blade dispenser 1 comprises a housing 2 with a bottom 3 and sidewalls 4 which together define a blade storage 5.

The blade dispenser 1 is additionally provided with a lid 6 covering an entry opening 7 in an upper part of the blade storage 5. The lid 6 is movable in relation to the blade storage 5 to provide access to the entry opening for arranging blades into the blade storage. In the illustrated embodiment it is by way of example assumed that the lid is movable by rotation around a rotation axis. Consequently, the lid can be located in the illustrated position where the entry opening 7 is revealed or alternatively in a closed position on top of the entry opening 7 when the blade dispenser is closed.

Figure 2:
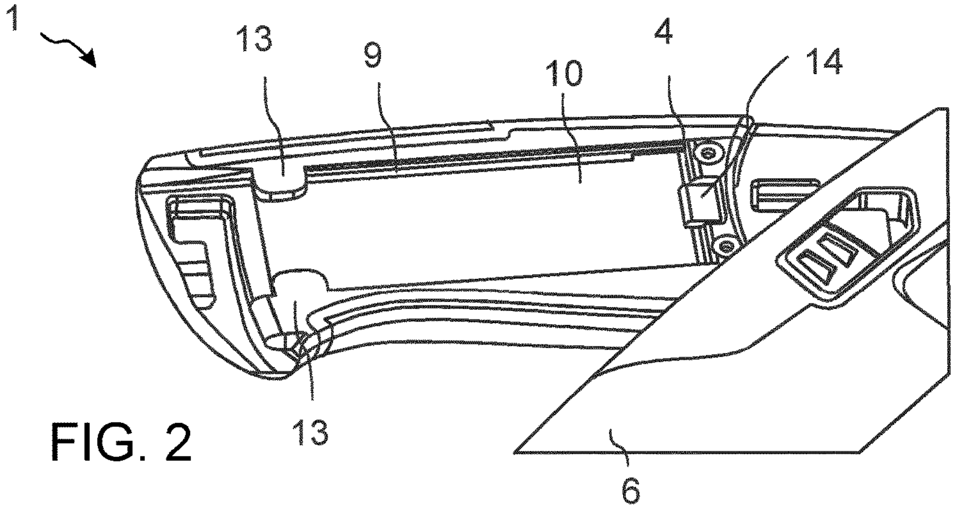

The blade dispenser is provided with a spring-element in a bottom part of the blade storage 5. In the illustrated embodiment it is by way of example assume that the spring-element includes two springs 8 attached with their lower ends to the bottom 3 of the blade storage 5 and a movable bottom plate 9, as illustrated in FIG. 2. This is, however, not necessary in all implementations, as in some implementations it may be sufficient to utilize a spring-element consisting only of one spring alone and no bottom plate.

In the illustrated embodiment blades are arranged in the blade storage 5 such that they are in contact with the upper first side surface 10 of the bottom plate 9 which faces the entry opening 7. An opposite second side surface, in relation to the first side surface 10, of the bottom plate 9 faces the bottom 3 of the blade storage and is in contact with the springs 8. In this connection the terms first side surface and second side surface refer to the two surfaces of the bottom plate 9 that have the largest surface area. Consequently, the springs 8 are located in a space between the bottom 5 and the plate 9.

Figure 3:
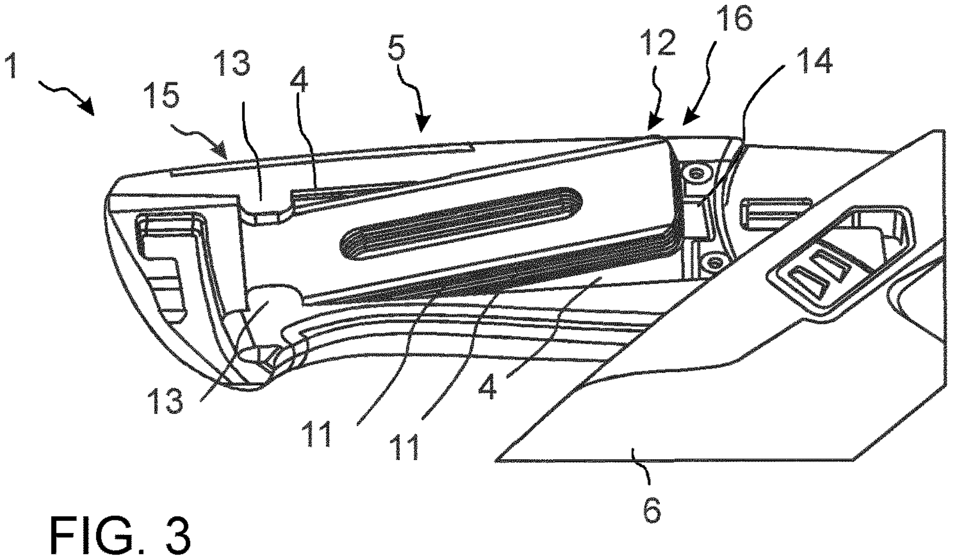

In FIG. 3 blades are introduced into the blade storage 5. In this example the blades are assumed to be planar and generally rectangular in shape. In FIG. 3 a plurality (such as eight) of such thin planar blades 11 are illustrated in a stacked configuration 12. From FIG. 3 it is also clear that the length and width of the bottom 3 of the blade storage 5 (and of the plate 9) is only slightly larger than the length and width blades 11 that are received in the blade storage. Consequently, the size and shape of the blades generally correspond to the size and shape of the bottom 3 and bottom plate 9. In this way the sidewalls 4 keep the received blades 11 firmly in a predefined configuration and position within the blade storage 5.

In the situation of FIG. 3, a first end of the blades 11 have been introduced into the blade storage 5 to a position between a protrusion 13 and the plate 9 of the spring-element. The protrusion 13 protrudes from a sidewall 4 into a first part 15 of the blade storage 5 in an upper part of the blade storage. In FIG. 3 two such protrusions 13 are illustrated though in some implementations one protrusion may be sufficient. In that case the single protrusion may extend all the way across the blade storage 5, for instance.

In FIG. 3 the second ends of the blades 11 (to the right in FIG. 3) are still located outside of the blade storage 5, in a position above a latch 14 protruding from a sidewall 4 into a second part 16 of the blade storage 5.

Figure 4:
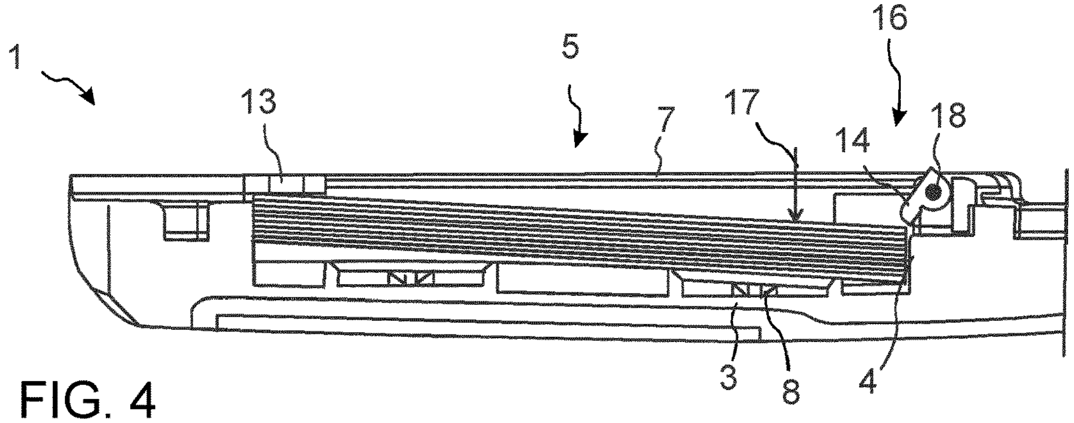
Figure 5:
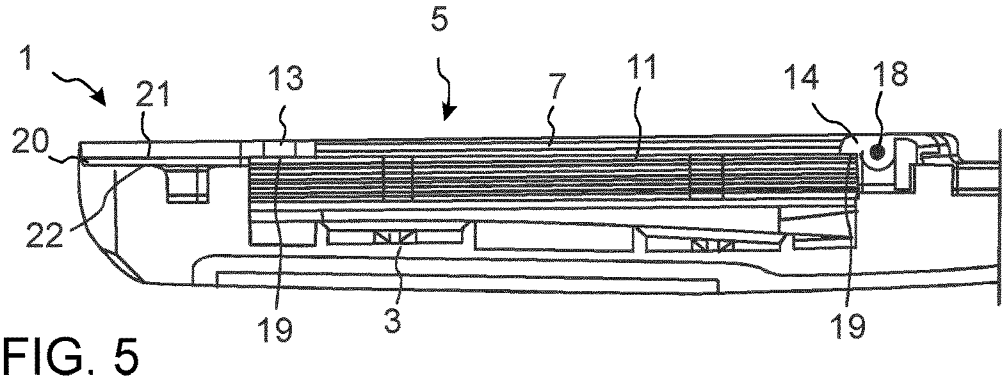

FIGS. 4 and 5 illustrate introduction of the second ends of the blades 11 into the blade storage 5. In FIG. 4 the second ends of the blades are pressed towards the bottom of the blade storage 15 as indicated by arrow 17. Due to this the latch 14 rotates around a rotation axis 18, downwards towards the bottom 3, to a load position closer to the sidewall 4 to allow moving of the blades 11 into the storage via the entry opening 7. Once the second ends of the blades 11 have passed the latch, further pressing of the blades towards the bottom 3 causes the spring-element with the springs 8 to be compressed. At this stage, when all blades 11 have passed the latch 14, the downward pressing of the blades 11 may end.

In FIG. 5 the downward pressing of the blades has ended. The springs 8 of the spring element have moved the blades upwards 11 towards the entry opening 7 by means of the spring force. The latch 14 has returned to the preventing position by rotation around the rotation axis 18 (due to springs 30 connected to the latch) where it protrudes into the blade storage 5. At this stage the contact surfaces 19 of the latch 14 and the protrusion 13 or protrusions prevent the spring force from the springs 8 in the spring-element from moving the blades 11 out of the blade storage 5 via the entry opening 7. At this stage the blades 11 remain stable within the blade storage 5, and the lid 6 can be closed on top of the entry opening 7 until the user needs to dispense a blade.

From FIG. 5 it can also be seen that the exit opening 20 has an upper surface 21 closer to the entry opening 7 and a lower surface 22 closer to the bottom 3. The protrusion 13 and latch 14 are arranged in the blade storage 5 such that the contact surfaces 19 of the protrusion 13 and latch 14 are located in a plane defined by the upper surface 21 of the exit opening. Due to this, dispensing of a blade can be done simply by moving the uppermost blade sideways into the exit opening. To ensure that only one blade 11 at a time is dispensed via the exit opening 20, the distance between the upper surface 21 and lower surface 22 is larger than the thickness of one blade 11 and smaller than the thickness of two blades.

Figure 6:
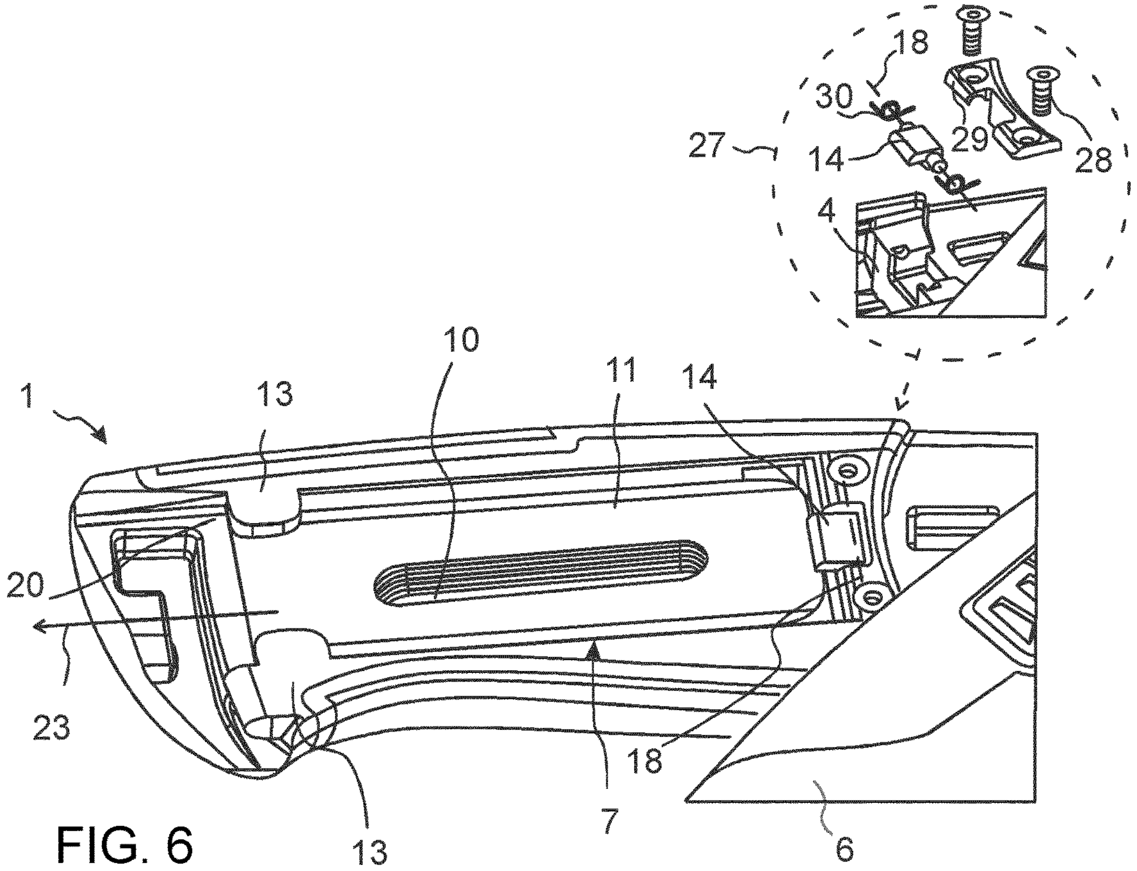

FIG. 6 illustrates dispensing of a blade 11. This can be done by moving the lid 6 to reveal the entry opening 7 and by touching the upper surface of the uppermost blade with a finger and pushing the uppermost blade 11 out sideways (to the left in FIG. 6) via the exit opening 20 as illustrated by arrow 23.

FIG. 6 also illustrates at reference number 27 attachment of the latch 14 by means of screws 28 and a removable lid 29 to the sidewall 4 of the blade storage such, that the latch is rotatable around a rotation axis 28 and returned to a preventing position by means of a spring force from springs 30 once blades have been arranged into the blade storage via the entry opening 7.

The blade dispenser 1 above explained and illustrated in the FIGS. 1 to 6 is very advantageous, as the user can simply by using one hand only, dispense a blade out of the blade dispenser 1 without even accidentally touching a sharp edge of the blade. This is a very quick and simple procedure due to which the interruption in the work that the user carries out is disturbed only minimally.

Figure 7:
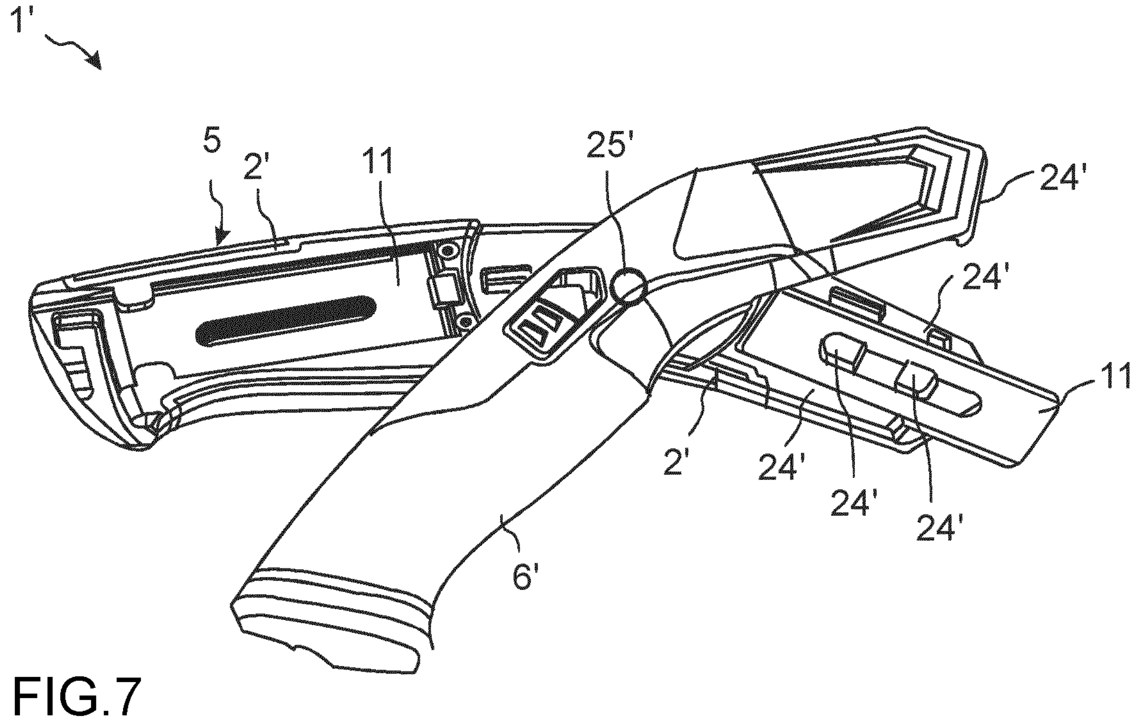
FIG. 7 illustrates a second embodiment of a blade dispenser.

FIG. 7 illustrates a second embodiment of a blade dispenser 1'. The embodiment of FIG. 7 is very similar to the embodiment explained in connection with FIGS. 1 to 6. Therefore, in the following the embodiment of FIG. 7 will be explained mainly by pointing out the differences between these embodiments.

In FIG. 7 the housing 2' is provided with attachment parts 24' attaching a cutting blade 11 into a cutting position. Consequently, in this embodiment the blade dispenser 1' is an integrated blade dispenser and knife.

As can be seen in FIG. 7, when the lid 6' is moved in relation to the blade storage 5 by rotation around the rotation axis 25' to reveal the entry opening, simultaneously, the attachment parts 24' attaching a cutting blade 11 in a cutting position are separated. This makes it possible, by using one hand only, to move the lid 6', remove the old cutting blade 11 from the cutting position, dispense a new blade from the blade storage 5, arrange the dispensed blade to the attachment parts 24', and finally, move the lid 6' back to the position where it covers the entry opening.

An advantage with the solution of FIG. 7 is that spare blades are always available in the knife itself in a user friendly and secure blade storage which is very easy and rapid to use.

Figure 8:
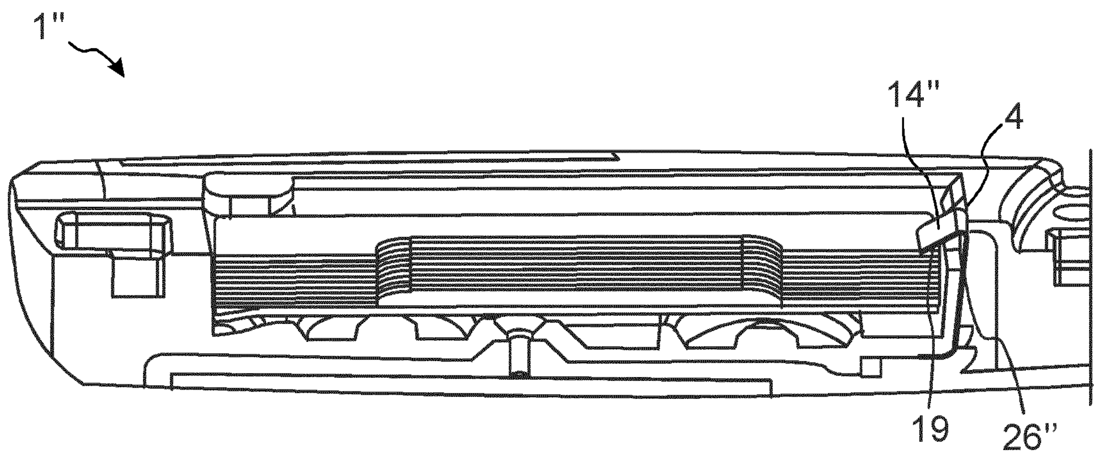
FIG. 8 illustrates third embodiment of a blade dispenser.

FIG. 8 illustrates third embodiment of a blade dispenser 1". The embodiment of FIG. 8 is very similar to the embodiments explained in connection with FIGS. 1 to 6 and 7. Therefore, in the following the embodiment of FIG. 7 will be explained mainly by pointing out the differences between these embodiments.

In FIG. 8 the latch 14' is not attached to a sidewall 4 rotatably as in the previous embodiments. Instead the latch 14" is implemented as an outer end of a spring 26", such as a leaf spring. Consequently, the spring force keeps the latch 14" in the preventing position illustrated in FIG. 8, where it protrudes into the blade storage. However, when blades are loaded into the blade storage via the entry opening and pressed downwards towards the latch 14", the latch is bent into the load position closer to the sidewall 4, to allow moving of blades into the storage via the entry opening.

It is to be understood that the above description and the accompanying figures are only intended to illustrate the present invention. It will be obvious to a person skilled in the art that the invention can be varied and modified without departing from the scope of the invention.

The invention claimed is:

1. A blade dispenser, comprising:
- a housing with a bottom and sidewalls defining a blade storage,
- a lid covering an entry opening in an upper part of the blade storage, the lid is movable in relation to the blade storage to provide access to the entry opening for arranging blades in a stacked configuration into the blade storage,
- a spring-element in a bottom part of the blade storage, the spring element directing a spring force from the bottom part towards the entry opening which moves blades received in the blade storage towards the entry opening,
- a protrusion protruding from a sidewall into the upper part of the blade storage in a first part of the blade storage,
- a latch protruding from a sidewall into the upper part of the blade storage in a second part of the blade storage, said protrusion and latch having contact surfaces preventing the spring force from moving blades out of the blade storage via the entry opening, and
- an exit opening at a sidewall of the housing allowing a blade to pass through the exit opening out of the blade storage.

2. The blade dispenser according to claim 1, wherein the spring-element comprises:
- a movable bottom plate with a first side surface facing the entry opening and an opposite second side surface in relation to the first side surface, which faces the bottom of the blade storage, and
- one or more springs in a space between the bottom and the movable bottom plate.

3. The blade dispenser according to claim 1, wherein the latch is pivotably attached to the sidewall to be rotated around a rotation axis from a preventing position, where the latch protrudes into the blade storage and the contact surface prevents moving blades out of the blade storage via the entry opening, to a load position, where the latch is rotated to a position closer to the sidewall to allow moving of blades into the storage via the entry opening.

4. The blade dispenser according to claim 1, wherein the latch is provided with a spring having a spring force moving the latch towards the preventing position.

5. The blade dispenser according to claim 1, wherein the latch is implemented as an outer end of a spring which in a preventing position protrudes into the blade storage and the contact surface prevents moving blades out of the storage via the entry opening, and which in a load position is bent against the spring force into a position closer to the sidewall to allow moving of blades into the storage via the entry opening.

6. The blade dispenser according to claim 1, wherein:

the exit opening has an upper surface closer to the entry opening and a lower surface closer to the bottom, and the protrusion and latch are arranged in the blade storage such that the contact surfaces of the protrusion and latch are located in a plane defined by the upper surface of the exit opening.

7. The blade dispenser according to claim 1, wherein:

the exit opening has an upper surface closer to the entry opening and a lower surface closer to the bottom, and the distance between the upper surface and lower surface of the exit opening is larger than the thickness of one blade and smaller than the thickness of two blades.

8. The blade dispenser according to claim 1, wherein the blade dispenser is a standalone blade dispenser dispensing cutting blades of a knife.

9. The blade dispenser according to claim 1, wherein;

the housing is provided with attachment parts attaching a cutting blade dispensed by the blade dispenser into a cutting position to provide an integrated blade dispenser and knife.

10. The blade dispenser according to claim 1, wherein the lid is pivotably attached to the blade dispenser to be moved by rotation in relation to the blade storage.

* * * * *